Jan. 4, 1966  J. KILBURG  3,226,926
GEOGRAPHICAL HOROLOGICAL INSTRUMENT
Filed Nov. 18, 1963  5 Sheets-Sheet 1

INVENTOR.
JAMES KILBURG
BY
Fryer + Tjensvold
ATTORNEYS

Jan. 4, 1966 J. KILBURG 3,226,926
GEOGRAPHICAL HOROLOGICAL INSTRUMENT
Filed Nov. 18, 1963 5 Sheets-Sheet 2

INVENTOR.
JAMES KILBURG
BY
ATTORNEYS

Jan. 4, 1966
J. KILBURG
3,226,926
GEOGRAPHICAL HOROLOGICAL INSTRUMENT
Filed Nov. 18, 1963
5 Sheets-Sheet 3
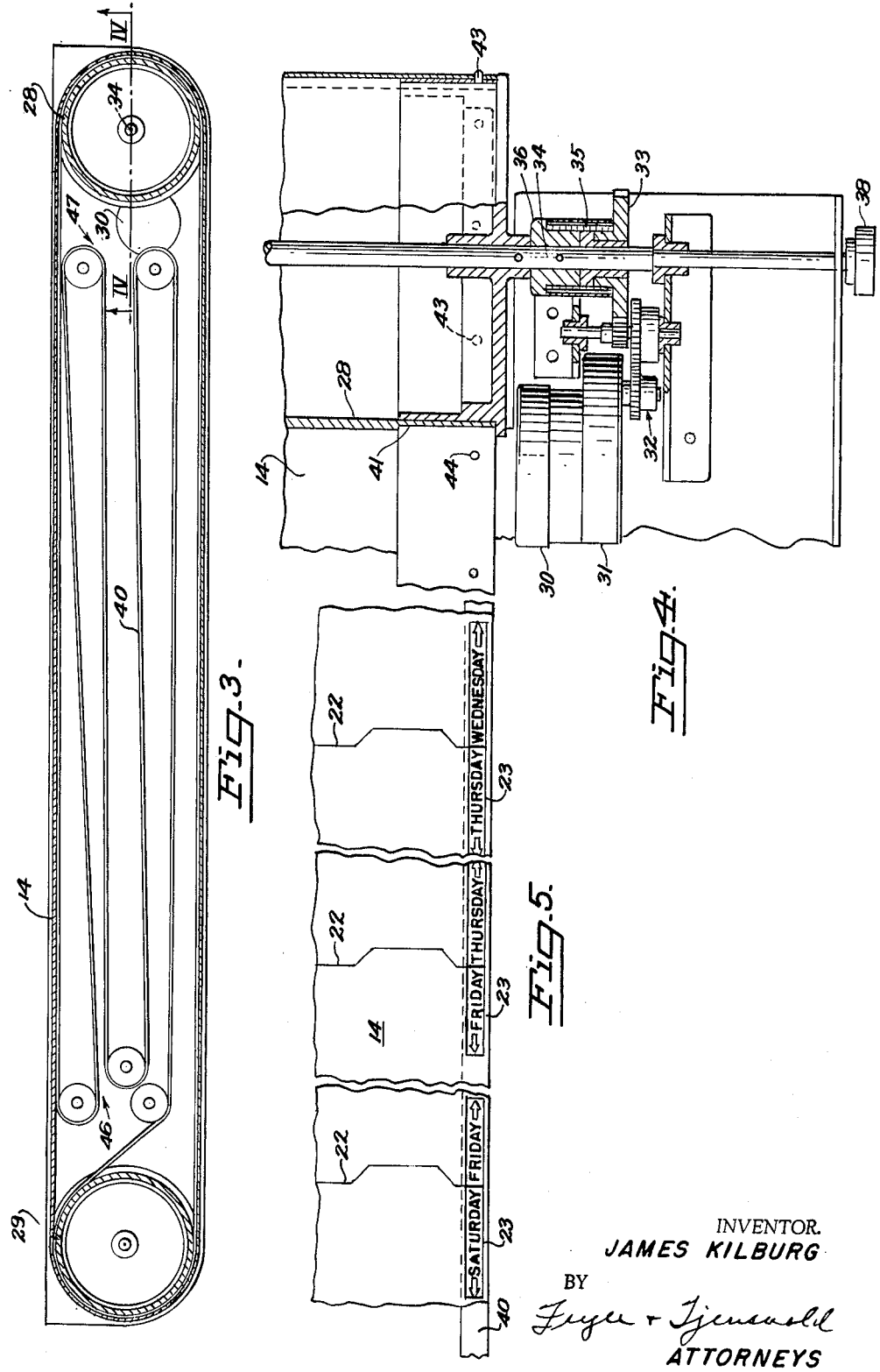
INVENTOR.
JAMES KILBURG
BY
Fryer + Tjensvold
ATTORNEYS

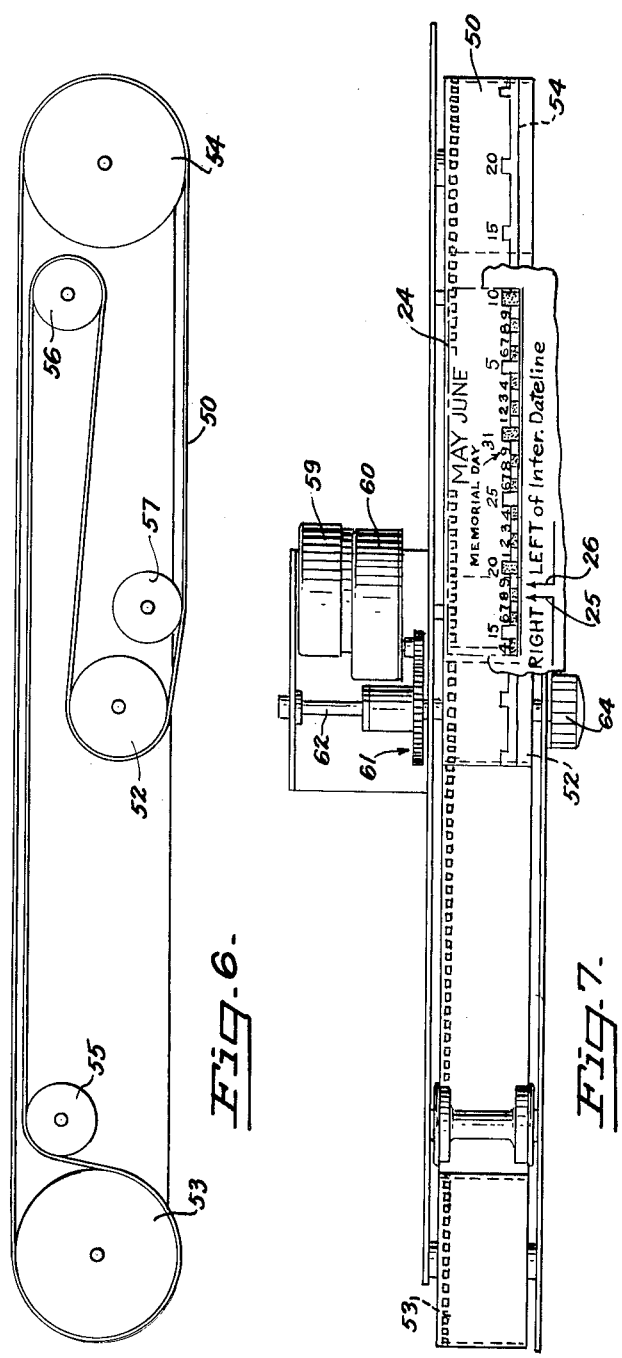

Jan. 4, 1966 J. KILBURG 3,226,926
GEOGRAPHICAL HOROLOGICAL INSTRUMENT
Filed Nov. 18, 1963 5 Sheets-Sheet 5
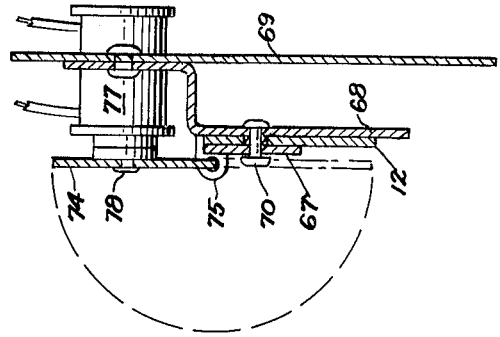
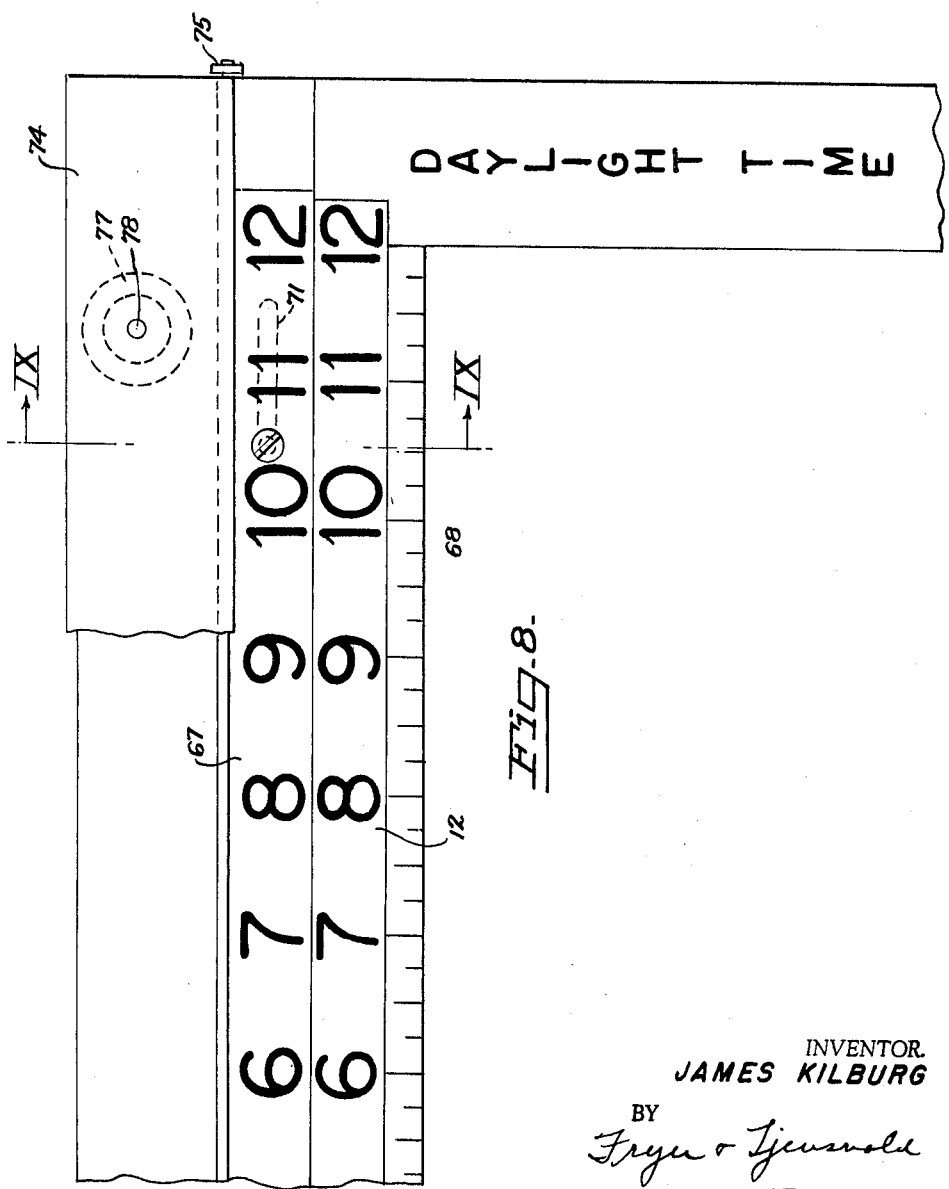
INVENTOR.
JAMES KILBURG
BY
Fryer & Tjensvold
ATTORNEYS

United States Patent Office 3,226,926
Patented Jan. 4, 1966

3,226,926
GEOGRAPHICAL HOROLOGICAL INSTRUMENT
James Kilburg, San Carlos, Calif., assignor to Kilburg Geochron Corporation, San Carlos, Calif., a corporation of California
Filed Nov. 18, 1963, Ser. No. 324,541
15 Claims. (Cl. 58—42.5)

This invention relates to an instrument for displaying the hour, day of the week and date simultaneously for any point within the civilized areas of the earth.

Attempts have previously been made to provide so-called world clocks or time maps displaying a cartographic representation of the earth's surface, together with clock means and means to represent the difference in time at different locations in the world. While many such attempts have resulted in the indication of local time, few have been capable of indicating zone time which is the time recognized throughout the major portions of the world for the regulation of all business, political and social activities. Furthermore none has been capable of representing zone time at all populated parts of the earth simultaneously by reference to a simple, single, cartographic representation of the earth's surface such for example as a Mercator projection of the world.

Furthermore previous attempts to indicate time with respect to all locations on the earth's surface have failed in part to recognize the existence simultaneously of two days. Of the few that have recognized this, none are capable of clearly and continuously indicating at a glance for example that at 11 a.m. on Friday, October 11, in San Francisco, it is 4 a.m. Saturday, October 12, in Tokyo.

It is, therefore, an object of the present invention to provide a combined geographical, chronological as to dates, and horological instrument for clearly and precisely indicating the day and zone time prevailing at any moment at any populated location on the earth's surface as well as local time.

A further object is to provide means to accomplish the above by reference to a simple, flat cartographic representation or map of the earth's surface as shown on a Mercator projection.

Another object of the invention is to provide means to display zone time in hours or parts thereof simultaneously at all parts of the earth by relative regulated movement between a map and a rectilinear time scale and simultaneously and continuously to display the extent of the prevailing day of the week on either side of the international date line on the map.

A further object is to provide means operable perpetually to display the prevailing calendar month and date on both sides of the international date line.

Other objects are to provide an instrument of the kind described which is energized electrically with means operable automatically to cover the time scale to prevent reading of inaccurate time after a failure of electric power and to provide such an instrument having simple means to adjust the time scale to display standard or daylight saving time selectively.

Further and more specific objects and advantages of the invention and the manner in which it is carried into practice are made apparent in the following specification wherein reference is made to the accompanying drawings.

In the drawings:

FIG. 3 is a central horizontal section through a portion of the mechanism of the instrument shown in FIG. 1 illustrating the relative position of the map and a week day displaying tape associated therewith;

FIG. 4 is an enlarged fragmentary section on the line IV—IV of FIG. 3 illustrating means for moving the map and day tape;

FIG. 5 is a schematic view showing the relationship between the map and day tape;

FIG. 6 is a horizontal sectional view illustrating the arrangement within the instrument of a tape for displaying the month and date;

FIG. 7 is a view in front elevation of the mechanism shown in FIG. 6.

FIG. 8 is a fragmentary view in front elevation of a fixed and movable time scale and concealing means therefore; and FIG. 9 is a sectional view taken on line IX—IX of FIG. 8.

Figure 1:
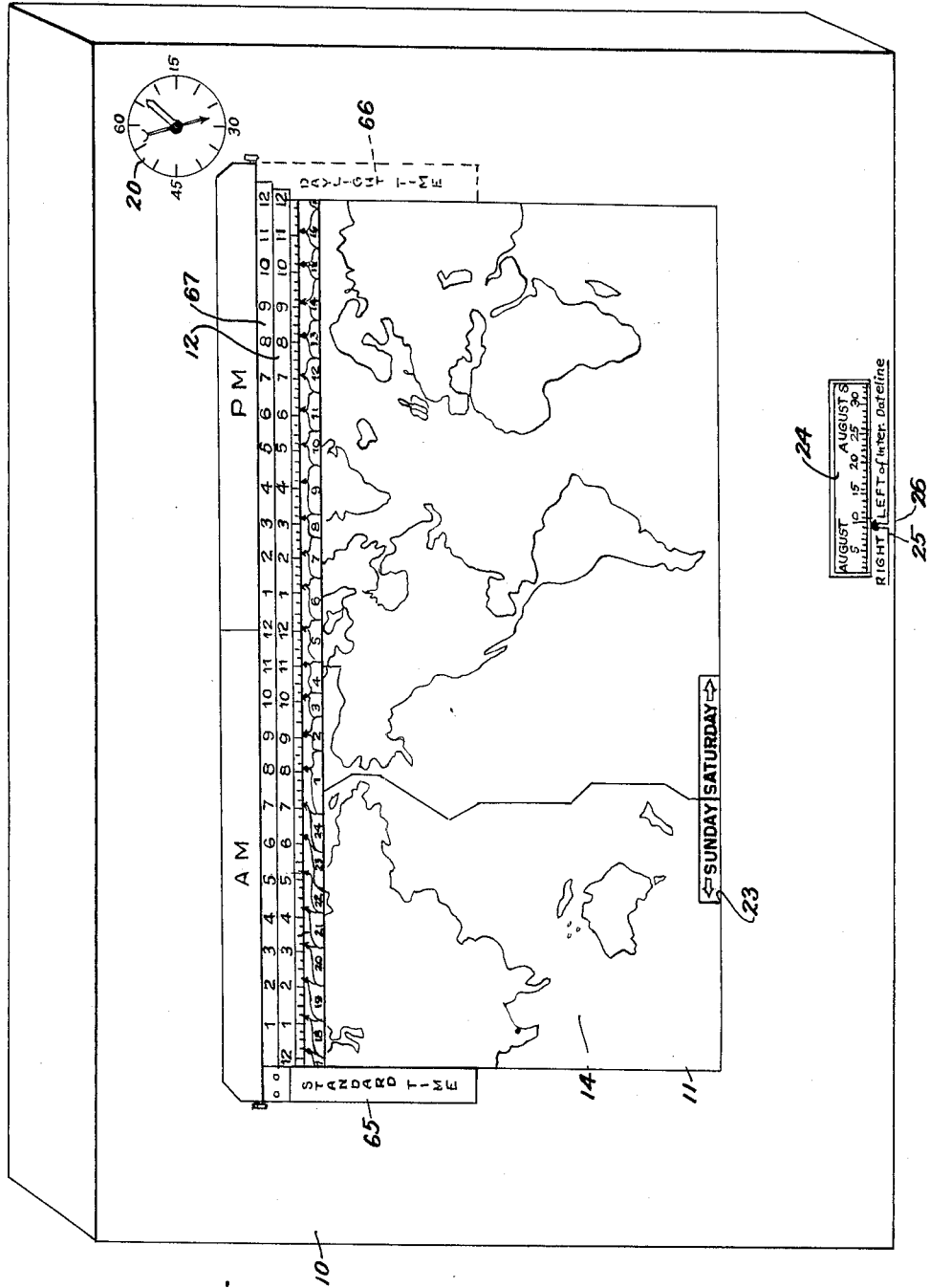
FIG. 1 is a perspective view of an instrument embodying the present invention.

An instrument embodying the present invention is shown in FIG. 1 of the drawing as contained within a case or housing 10. The housing has a front opening 11 to display a map of the world in the form of a Mercator projection which is actually a plurality or at least three maps printed continuously as an endless belt mounted and driven in the manner presently to be described for continuous movement past the opening 11 so that the entire earth's surface is represented therethrough at one time and progresses across the opening and with relation to a time scale 12 arranged above the opening once each twenty-four hours.

Figure 2:
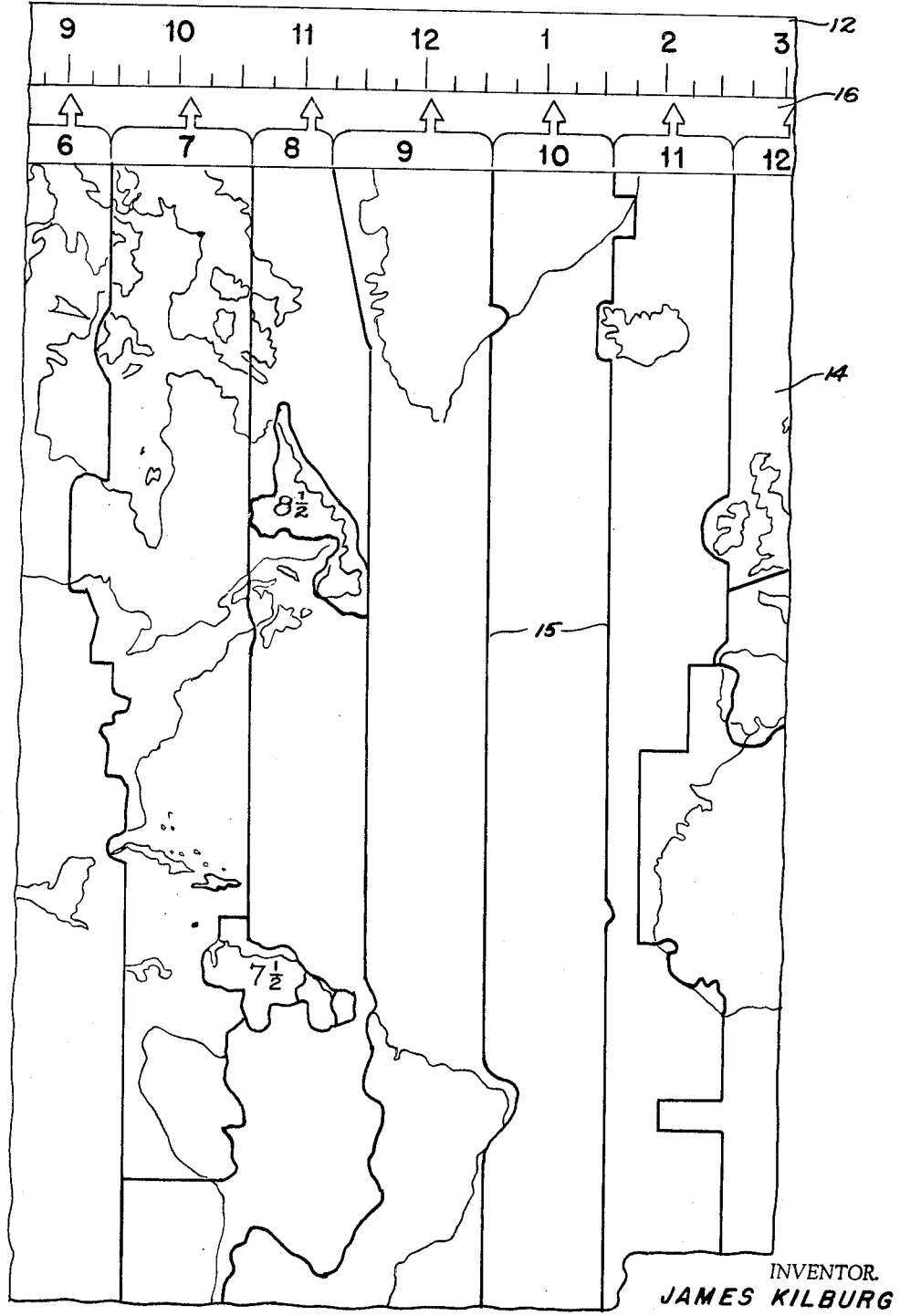
FIG. 2 is an enlarged view in elevation of a portion of a map and time scale of FIG. 1 illustrating the arrangement of lines denoting time zones on the map and illustrating the manner in which the zones, though of irregular configuration are related to the time scale for indicating zone time.

The map shown at 14 has printed upon it, as best shown in FIG. 2, lines 15 representing time zones and the same material upon which the map is printed extends upwardly to provide a horizontal band 16 at the upper edge of the map. Printed on the band 16 are a bracket 17 and an arrow 18 corresponding to each time zone appropriately numbered (letters are sometimes used to designate time zones) and indicating the position of the zone with respect to the time scale 12. In this connection, it must be taken into consideration that the original consideration in the provision of time zones was to select standard meridians at 15° intervals and define zones of 15° width extending 7½° east and west of each such meridian. However it the ultimate adoption of standardized zone time throughout the greater part of the world, political and geographic considerations resulted in many variations from the original equal and uniform divisions. Thus the highly irregular zones such as typified by the lines 15 on the map shown in FIG. 2 must be related to a uniform time scale and have heretofore prevented the representation of true zone time by reference to a relatively moving map and rectilinear time scale. The zones are of course also represented on the map of FIG. 1 but are omitted from the drawing because of its relatively small scale. For example, all central European countries from Spain in the west to Poland in the east are in zone 13 which, in this area, is greater in width than two normal 15° zones. Also in Siberia, Mongolia and China there are many areas where time in one zone would be indicated at the top of the map by the position of the Standard meridian in an adjacent zone. Consequently efforts to read zone time with a straight line or marker disposed vertically of a map or parallel to the meridian on a Mercator projection result in readings which are incorrect by an hour or more in many places. In accordance with the present invention, the brackets 17 at the upper edge of the map bridge the time zone lines as they appear at that edge but the arrows 18 are equally spaced, located above the standard meridians at which zone time is established and represent hourly spacing on the time scale. Thus, as shown, the arrows do not occur centrally of their respective brackets and as may be seen in the upper left hand portion of the map appearing in FIG. 1, some arrows must be extended far beyond the limit of the zone with which they are associated to produce a true reading of zone time for the zone which they represent.

Some areas of the world do not adhere to Standard zone time but have established their own time at a variation of a few minutes or more from zone time and these areas or pocket zones, as they may be termed are marked upon the map to indicate zone 7+½ hour or zone 8+½ hour. (See FIG. 2.)

Instruments sold for use in any particular time zone or locality have the bracket at the top of the local zone distinctively colored to make particularly outstanding the time for that locality. The time in any other locality may of course be read by reference to the arrow corresponding to the zone which embraces the locality. Since the time scale on small models of the instrument is not of sufficient size for the clear representation of minutes thereon, it is divided into fifteen minute periods as illustrated in FIG. 2 and a standard clock is enclosed in the housing 10 with its dial displayed at the front of the housing, as shown at 20 in FIG. 1. This clock may be provided with a minute hand and a second hand as illustrated and may have an hour hand which would represent time only in the zone in which the instrument is used, the hour in the other zones being represented on the time scale 12.

Since, but for an instant each twenty-four hours, the day of the week and date differ on either side of the international date line, which is shown at 22 in FIG. 1, true world time can only be realized by the display of two days and two dates simultaneously. The two days of the week are displayed through openings 23 cut in the material upon which the map is printed and bridging the international date lines. The two dates are shown through a window 24 in the housing 10. The dates are represented by stationary arrows 25 and 26 on the housing pointing to a continuously moving calendar.

FIGS. 3, 4 and 5 of the drawings illustrate the mounting and drive means for the map and tape which displays the days of the week. In FIG. 3, the map 14 which, as previously described, is three maps joined to provide an endless belt is trained over a driving drum 28 and an idler drum 29 disposed at opposite ends of the housing so that, upon rotation of the driving drum 28 in a clockwise direction as viewed in FIG. 3, a complete map of the world continuously moves past the opening 11 in the housing. The drum 28 is driven by a synchronous motor 30, driving through reduction gearing contained in a housing 31 and further reduction gearing generally indicated at 32, to impart rotation through a gear 33 to a shaft 34 which carries the drum. The shaft 34 is rotatable with respect to the gear 33 and a one way clutch in the form of a coil spring 35 embraces the hub of the gear and a bushing 36 secured to the shaft so that a drive is imparted in one direction only and the position of the map may be adjusted by rotation of the drum manually, by means of a knurled finger wheel 38 secured to the shaft.

The day tape is shown at 40 as trained over the drum 28 and 29 directly behind the lower edge of the map and the drums are reduced in size adjacent their lower end to provide grooves, one of which is shown at 41 in FIG. 4, to accommodate the day tape. The day tape is seven times the length of a single representation of the world on the map belt and has printed upon it the days of the week in seven pairs as illustrated in FIG. 5 as Wednesday-Thursday, Thursday-Friday, and Friday-Saturday and so on. FIG. 5 is a schematic view with the map belt shown flat and reduced in size in comparison to the day tape. The spacing between pairs of days printed on the tape is exactly the same as the spacing between the international date line 22 on the three maps and the tape is driven at the same lineal speed as the maps so that wherever the international date line appears on the map belt exposed through the opening 11 of the housing, the prevailing days on the opposite sides of the line are displayed through the opening 23 as shown in FIG. 1.

There is one exception to the display of two days in the manner above described. This occurs when one international date line on the moving map belt is vanishing beneath the right hand side of the opening 11 in the housing while the date line for the next map on the belt is appearing at the left of the opening. At this moment which occurs at midnight at the international date line, a single day, that is designated day of the week, prevails throughout the world and this is accurately depicted since, as may be seen in FIG. 5, the name of the same day will be displayed through half of an opening 23 at one side of the map and through half of another opening 23 at the opposite side of the map.

Since the day tape is considerably longer than the map belt, it is trained over idler rollers, generally indicated at 46 and 47 in FIG. 3, the number and spacing of which is just sufficient to maintain the tape taut as its front flight moves continuously directly behind the front flight of the map belt. The day tape and map belt are simultaneously driven by sprocket teeth 43 shown in FIG. 4 as projecting through registering perforations 44 in the belt and tape.

With the mechanism just described, it is possible to determine quickly and without mental calculations or computation which designated day prevails at any given point on the complete map of the world as it is displayed through the opening 11 of the housing. The proportion of the earth's surface experiencing any particular day is also graphically illustrated. For example with the international date line occupying the position shown in FIG. 1 slightly less than one third of the earth is experiencing Sunday while the rest of the earth experiences Saturday. This is a constantly changing proportion but a mere glance also reveals that it is Sunday, August 10 in India and Saturday, August 9 in Africa.

The month and date are shown on a date or calendar belt displayed through the opening 24 in FIG. 1 and best shown in FIGS. 6 and 7. The calendar belt is shown at 50 as an endless belt having a full calendar year printed throughout its length, a part of which is disclosed in FIG. 7. Each day of each month is represented as a space on the belt and for convenience in reading, the alternate spaces are differently colored. The length of the belt is determined by the size of the spaces which represent a day so that the calendar is continuous progressing through December 31 to January 1 without a gap or additional space. The calendar tape is trained over a sprocket roller 52 having suitable teeth registering with perforations 53 in the tape and over two large idler rollers 53 and 54. Smaller rollers 55 and 56 take up the slack in the tape so that the entire assembly fits within the instrument housing and another small idler roller 57 positions the front flight of the tape so that it lies directly behind the opening 24 in the housing. Sprocket roller 52 is driven by a synchronous motor 59 through reduction gearing in a case 60 and reduction gearing generally indicated at 61 connected with the shaft 62 of the sprocket roller through a one-way clutch, not shown, but similar to that shown at 35 in FIG. 4. The tape is thus driven throughout its entire length to cause each of the 365 calendar dates thereon to register with one of the arrows 25 or 26 in the course of a year. Thus the calendar in addition to indicating the date to the right or to the left of the international date line displayed on the map belt operates continuously and must be adjusted only once in four years to allow for February 29 in leap year. This adjustment can be made through the knurled finger wheel shown at 64 as attached to the same shaft upon which the sprocket roller 52 is mounted. An alternate form of calendar tape which operates perpetually without adjustment is longer and bears four yearly calendars arranged successively and with one showing twenty-nine days in February.

Many parts of the world in the northern hemisphere change to daylight savings time by advancing the time scale one hour during certain months of the year. The time scale 12 is numbered to represent two twelve-hour periods or may be numbered to represent one twenty-four hour day if desired. It is supported for shifting movement so that it may be adjusted or advanced toward the left the distance of one hour. The scale is provided with depending members shown at 65 and 66 in FIG. 1 bearing the legends "standard time" and "daylight time," respectively, so that upon shifting of the scale toward the left the daylight-time legend, normally concealed behind the housing 10 will come into view and the standard-time legend normally displayed will move to a concealed position behind the housing. The configuration of the opening 11 through which the map appears is such that it is contiguous with the member 65 of the upper left hand side of the map and consequently when the member 65 moves toward the left a space on the map representing one hour is exposed in the northern hemisphere while a similar space is covered by the member 66 and only that portion of the map which represents a day measured by daylight time is exposed.

A stationary time scale shown at 67 in FIG. 1 is associated with the movable time scale 12 so that standard time and daylight time may be displaced simultaneously. The construction and supporting means for both scales is best illustrated in FIGS. 8 and 9 wherein they are shown as supported by a bracket 68 secured as by rivets or the like to a frame member 69. The lower edge of the bracket 68 carries the spaced lines representing hours and quarter hours as shown in FIG. 8 and the stationary scale 67 is supported in front of and spaced from the bracket 68 by means of screws such as indicated at 70. The movable scale 12 is disposed between the bracket 68 and stationary scale 67 and is provided with elongated slots, one of which is shown at 71 in FIG. 8 which embraces the screws 70 and are of a length to permit sliding movement of the scale a distance corresponding to exactly one hour as represented thereon. Consequently, upon sliding movement of the scale 12 toward the left, the numeral 12 thereon will underlie the numeral 11 on the stationary scale and designate daylight time while the stationary scale remains in place for the purpose of simultaneously designating standard time.

The instrument is described herein as electrically driven though mechanical clock mechanisms may be employed in place of synchronous motors for installations where electric power is not available. Where electric power is employed, a temporary failure of power will result in the display of incorrect time even as with an ordinary electric clock. To prevent reading of the time scale in such an event, the scale is automatically covered upon power failure and remains covered until the instrument has been reset to the proper time and the cover removed. This is accomplished by mechanism illustrated in FIGS. 8 and 9. A plate 74 which is at least as large as the numbered portions of the two time scales 12 and 67 is pivotally supported at its ends, one pivot being shown at 75. The normal position of the plate is raised as shown and it is held in its raised position by a solenoid shown at 77 which attracts a disc 78 of magnetic material secured to the plate This disc is necessary only because the plate 74 is made of light non-magnetic material. The solenoid 77 is in the same circuit which supplies energy to the several synchronous motors so that upon failure of power in said circuit, there is also a failure at the solenoid and the plate falls to the position indicated in broken lines in FIG. 9 where it conceals the number of scales and prevents the reading of incorrect time until electric energy is again provided and the plate is raised into contact with the solenoid. The electric circuits including the synchronous motors and the solenoid are entirely conventional and since they form no part of the invention claimed herein, are not disclosed.

I claim:

1. An instrument for displaying standard zone time at different places simultaneously which comprises a cartographic representation of earth surface on a medium with standard time zones delineated thereon, a rectilinear time scale with equally spaced calibrations representing hours, equally, identically, and correspondingly spaced marks on the medium bearing said representation disposed adjacent an edge of the time scale, means graphically relating each of said marks to a delineated time zone at an adjoining edge of the representation of earth surface, and means to impart relative motion between the time scale and said medium.

2. The combination of claim 1 in which the last named means is manually actuated.

3. The combination of claim 1 in which the last named means is power actuated at a rate to indicate the passage of time between earth surface and the scale.

4. An instrument for designating time simultaneously in different time zones which comprises a cartographic representation of earth surface on a first medium, a time scale dimensionally related to said representation and extending eastwardly and westwardly thereof on a second medium, means to impart relative east-west movement to said first medium to indicate passage of hours on the time scale, said representation having the international date line delineated thereon, means indicating the prevailing day of the week on opposite sides of said line, and means imparting corresponding east-west movement to said indicating means whereby it will follow the first medium.

5. An instrument for designating time simultaneously at different places which comprises a cartographic representation of earth surface on a first medium, a time scale dimensionally related to said representation and extending eastwardly and westwardly thereof on a second medium, means to impart relative east-west movement between said media, said representation having the international date line delineated thereon and having an area adjacent the first medium bridging said line, a third medium displaying names of days in groups of two, and means imparting corresponding east-west movement to the third medium to display the names of prevailing designated days at said area on opposite sides of the date line.

6. The combination of claim 5 in which said area is a window in the first medium.

7. The combination of claim 5 in which the first medium is an endless belt with a Mercator projection of earth surface presented thereon at least three times in continuous east-west succession, spaced means supporting said belt, a frame disposed to delineate one such projection between said means, a window bridging the international date line on each projection, said third medium comprising a tape trained over said means for display through said windows, and means for moving the belt and tape at the same linear speed.

8. The combination of claim 7 in which the tape is at least seven times longer than the spacing between international date lines on the belt and the groups of days thereon occur at intervals corresponding to such spacing.

9. The combination of claim 5 with a fourth medium bearing a calendar of months and dates, and means to actuate said fourth medium at a speed related in time to the relative movement of the other media.

10. The combination of claim 9 in which the fourth medium is an elongated tape with a calendar year displayed longitudinally thereof, stationary frame means concealing all but a portion of the calendar and means on the frame relating to two days in the exposed portion as related to the international date line.

11. An instrument for indicating time at different locations in the world simultaneously comprising a housing with a framed opening, a cartographic representation of earth surface in the housing, means to move said representation past the opening at constant speed to present to view a continuously moving representation of earth surface, a twenty-four hour time scale contiguous to an edge of the opening which is parallel to the direction of movement, spaced reference marks on the representation for cooperation with the time scale for indicating time in different time zones, means supporting the time scale for adjustment longitudinally of itself a distance corresponding to one hour thereon to enable direct reading therefrom of daylight time, said time scale being above and coextensive with said framed opening, and means depending from opposite ends of the time scale to vary a delineated area of earth surface to correspond to one hour of earth moving upon adjustment of the scale.

12. An instrument for designating the day of the week on opposite sides of the international date line comprising a cartographic representation of earth surface having the international date line delineated thereon and having an area adjacent said representation bridging said date line, means displaying names of days in groups of two, and means producing relative movement of said representation and said means to display the names of prevailing designated days at said area.

13. The combination of claim 12 in which said area is a window in the cartographic representation and said means is disposed behind said window.

14. In an instrument of the kind described comprising a cartographic representation of earth surface with the international date line delineated thereon, means displaying at both side of the date line names of days of the week prevailing at said sides with indicative longitudinal extension of the names of the days displayed, and means to produce timed relative movement of said representation and said means to substantially continuously designate the geographic extent of the prevailing day of the week on both sides of said date line.

15. The combination of claim 14 with separate means for displaying the month and date prevailing on both sides of the international date line.

References Cited by the Examiner

UNITED STATES PATENTS

| | | | |
|---|---|---|---|
| 434,137 | 8/1890 | Piechawski | 58—43 |
| 2,001,633 | 5/1935 | Segovia | 58—43 |
| 2,023,677 | 12/1935 | Fowler | 58—44 |
| 2,130,873 | 9/1938 | Bourquin | 58—125 |
| 2,299,913 | 10/1942 | Clough | 58—44 |
| 2,417,695 | 3/1947 | Lewis | 58—44 |
| 2,603,940 | 7/1952 | Packard | 58—44 |
| 2,721,442 | 10/1955 | Pettigrew | 58—44 |

FOREIGN PATENTS 454,879  2/1950  Italy.

LEO SMILOW, *Primary Examiner.*